United States Patent [19]

Winterhalter et al.

[11] 4,197,016
[45] Apr. 8, 1980

[54] FOOD CLEANSING MACHINE

[75] Inventors: Karl Winterhalter, Wasserburg; Wolfgang Schaffron, Tettnang; Gerhard Kunze, Meckenbeuren; Gerhard Steiner, Tettnang, all of Fed. Rep. of Germany

[73] Assignee: Firma Karl Winterhalter Kommanditgesellschaft, Meckenbeuren, Fed. Rep. of Germany

[21] Appl. No.: 916,825

[22] Filed: Jun. 19, 1978

[30] Foreign Application Priority Data

Sep. 15, 1977 [DE] Fed. Rep. of Germany ....... 2741871

[51] Int. Cl.² .............................................. B08B 3/02
[52] U.S. Cl. .................................. 366/165; 366/159; 134/104; 134/111; 134/182; 134/198
[58] Field of Search ............. 134/58 R, 104, 110–111, 134/139, 182–183, 198, 200; 366/137, 159, 165–166, 176–177, 262

[56] References Cited

U.S. PATENT DOCUMENTS

| 1,986,019 | 1/1935 | Shaffner | 366/137 X |
| 2,764,169 | 9/1956 | Bazarnic | 134/110 |
| 2,997,373 | 8/1961 | Stephens | 366/137 X |
| 3,103,225 | 9/1963 | Schmitt-Matzen | 134/111 X |
| 3,338,251 | 8/1967 | Nobili | 134/198 X |
| 3,949,772 | 4/1976 | Hartmann | 134/200 X |

*Primary Examiner*—Robert L. Bleutge
*Attorney, Agent, or Firm*—Ernest F. Marmorek

[57] ABSTRACT

A food cleansing machine includes a container for receiving food, a pump for injecting rinsing fluid into the container tangentially, coarse and fine sieves for sifting the food from any impurities, and a discharge device for flushing out the impurities together with the rinsing fluid. The operative surface area of the fine sieve exceeds the operative surface area of the coarse sieve.

15 Claims, 5 Drawing Figures

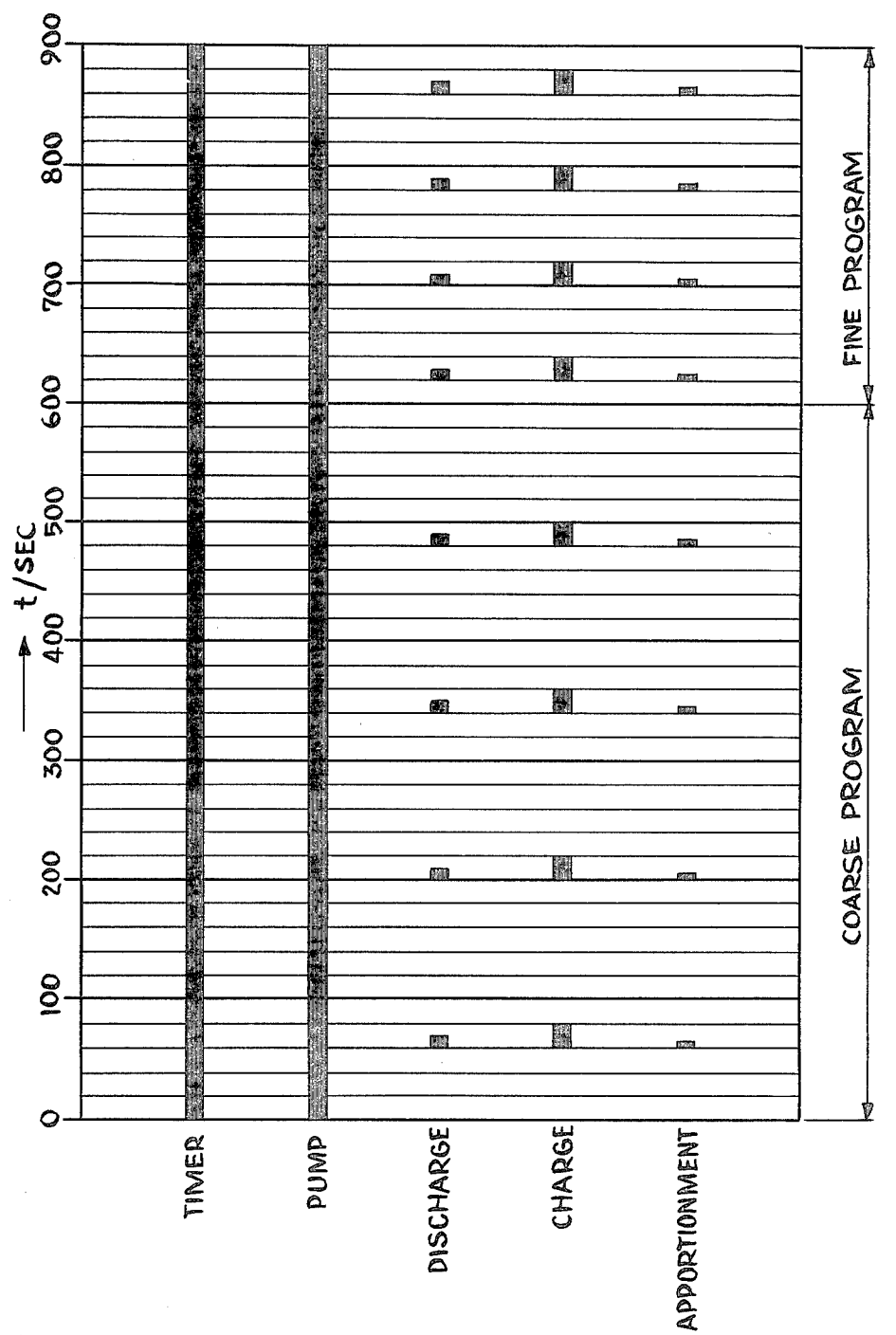

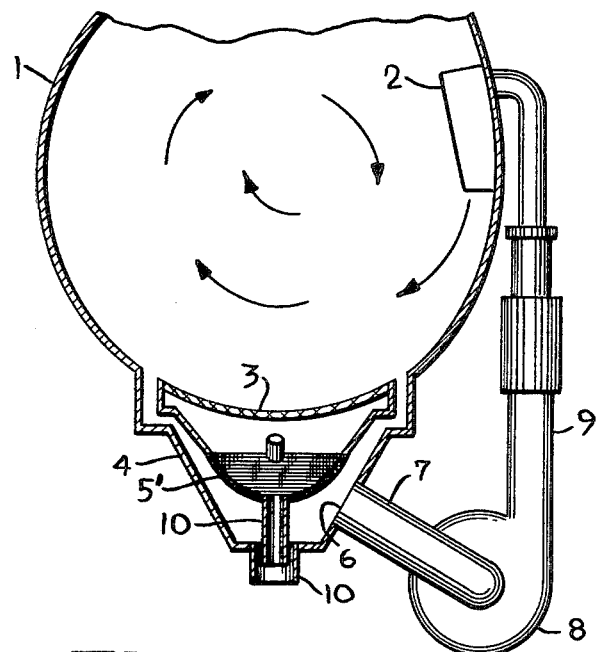

FOOD CLEANSING MACHINE

BACKGROUND OF THE INVENTION

Cleansing machines for cleaning of vegetables, salads and the like are known, which include a container for receiving the goods to be cleansed having a substantially circular, particular cylindrical circumference. Rinsing water is fed into the container by means of a recirculating pump, substantially tangentially, and made to move in a circular manner.

At the lower part of the container, there is disposed a coarse mesh to which there is secured a discharge drain, which in turn contains a sieve retaining any impurities, the discharge drain having an outlet communicating with the recirculating pump.

These known machines have the disadvantage that the operative surface area of the sieve disposed in the discharge drain is considerably smaller than the operative surface area of the mesh disposed at the lower portion of the rinsing container, so that there occurs an increase in the velocity of fluid of the sieve, as a result of which a considerable amount of impurities pass through that sieve into the recirculating pump, and hence are also again returned into the rinsing container.

SUMMARY OF THE INVENTION

It is one of the objects of the present invention to avoid the above disadvantages.

This is achieved by the food cleansing machine, according to the present invention, including a drum-type container adapted to receive the food to be cleansed of impurities, pump means communicating with the container for injecting a rinsing fluid substantially tangentially into the container to circulate therein, and adapted to separate impurities for the food, sifting means disposed near the bottom of the container, and being operative for substantially passing only the impurities and the rinsing fluids therethrough, and discharge means connected to the bottom of the container for removing the impurities and the rinsing fluid. The sifting means include coarse and fine sifting meshes having first and second predetermined mesh dimensions and operative surface areas, respectively; the first mesh dimensions substantially exceed the second mesh dimensions, and the second operative surface area exceeds the first operative surface area.

By these means, it is achieved that on the one hand very small impurities such as precipitates, vermine, and the like which manage to pass through the coarse mesh are prevented from being recirculated, but on the other hand an increased circulating velocity, and hence an increased suction, is avoided at the fine sieve with respect to the circulating velocity of the coarse sieve, so that the risk of passage of impurities which might return to the circulating pump, is very effectively reduced. The mesh dimensions of the coarse sieve are preferably 6 millimeters in length and width, while the mesh dimensions of the fine sieve are preferably 0.4 millimeters in length and width. The operative surface area of the fine sieve exceeds the operative surface area of the coarse sieve by preferably a factor of at least two.

The container has preferably substantially the shape of a cylinder, and the fine sifting mesh is preferably disposed in a plane parallel to the longitudinal axis of the cylinder. The fine sifting mesh is preferably disposed at an angle with respect to the direction at which the rinsing fluid passes through the cleaning machine.

It is advantageous if the fine sifting mesh has a cone-shaped profile. In an alternate embodiment the fine sifting mesh may have a semi-circular shape. The fine sifting mesh is preferably detachably mounted on the container. The container is preferably provided with an entrance opening for the rinsing fluid to pass thereinto, and includes a nozzle disposed near the entrance opening for forming the fluid into an operative jet flow; the jet flow preferably extends over substantially the entire length of the cylindrical container.

It is advantageous if a plurality of nozzles are provided, so that each nozzle is operative to expel a substantially flat jet stream, and additionally a plurality of feed tubes are provided which connect the pump to the nozzles; each nozzle then communicates with a corresponding feed tube.

It is advantageous if each nozzle includes a plurality of partitions for splitting the substantially flat operative jet stream into a plurality of jet streamlets. It is also advantageous if a plurality of partition walls are provided, and are disposed substantially parallel to each other, and substantially at right angles to the longitudinal axis of the cylindrical container.

It is particularly advantageous if programming means are provided for setting up and controlling a discharge for the rinsing fluid, a fluid-replenishing cycle, and an apportioning of additive means to the rinsing fluid. The programming means is preferably time-controlled, so as to yield a coarse program of approximately 600 seconds duration, and a fine program of approximately 300 seconds duration.

The machine, according to the present invention, operates particularly effectively if the rinsing water, being forced into the rinsing container by the recirculating pump, passes through nozzles which are adapted to expel a substantially flat jet stream, thus preventing the formation of a turbulent region, and where the jet streams extend preferably uniformly over the whole length of the container, which is shaped as a cylinder, thus there is achieved on both the coarse and fine meshes a distribution of the impurities, which is as uniform as possible, and local blockages or obstructions are avoided.

An operative improvement, according to the invention, is the additional use of programming means, which permits the attainment of an optimum ratio between the recirculating time intervals of pure rinsing water, and the time intervals of supplying fresh water; it particularly prevents any pulverizing of vegetables or salads to be cleansed through too rapid rinsing by water largely devoid of minerals, which in turn results in the destruction of cells of the goods to be cleansed.

BRIEF DESCRIPTION OF THE DRAWING

The invention will be better understood by means of the accompanying drawing in which:

FIG. 4 shows a typical program of the program means for the machine; and

FIG. 5 is fragmentary sectional view, similar to FIG. 1, but embodying a modification.

DESCRIPTION OF THE PREFERRED EMBODIMENTS

Figure 1:
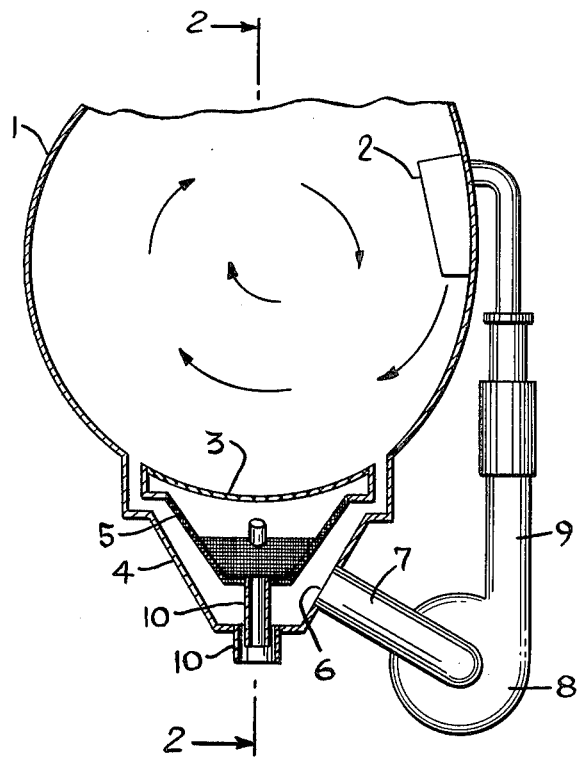
FIG. 1 is a section of the food cleansing machine, according to the present invention, transverse to the axis of the rinsing container.
Figure 2:
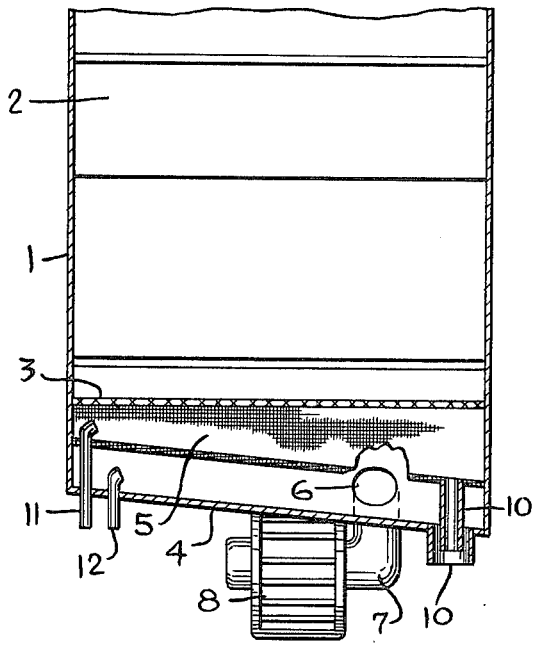
FIG. 2 is a section of the machine along the lines 2—2 of FIG. 1.

In FIGS. 1 and 2, there is shown a rinsing container 1, which has an approximately cylindrical shape, particularly a cylindrical shape somewhat flattened on one longitudinal side, there being disposed on the inner surface of the cylinder in the vicinity of its upper rim, a nozzle 2 through which the rinsing water passes substantially tangentially into the container 1. The vegetables or the like, which are to be cleansed, are passed through an aperture near the top of the container thereinto. Fresh water is supplied into the container in a known manner, also in the vicinity of the upper rim of the container 1. A coarse sieve is provided on a lower wall of the container 1, which has mesh dimensions of approximately 6 millimeters, and therefore retains, in addition to the goods to be cleansed, also impurities of substantially large dimensions, if the rinsing water is passed from the container 1 into a discharge drain 4, which extends parallel with the axial length of the container 1, and is inclined at one end thereof, which end communicates with an outlet 10. Within the discharge drain 4, and extending approximately parallel thereto, there is also disposed a sieve 5 of fine dimensions, which has, similar to the discharge drain 4, a funnel-like shape (FIG. 1), or, alternately, a semi-circular cross-section 5' (FIG. 5); the fine sieve 5, 5' has sieve dimensions considerably smaller than that of the coarse sieve, but an operative area larger than that of the coarse sieve.

A longitudinal wall of the discharge drain 4 is formed with a discharge opening 6, which communicates with a tube 7, which in turn communicates with an inlet of a recirculating pump 8, the latter having an outlet 9 communicating with the container 1 through the nozzle 2. The rinsing water and goods to be cleansed are then moved in the sense of the arc-shaped arrows shown in FIG. 1.

Small-sized impurities passing through the coarse sieve 3 are retained by the sieve 5 having fine dimensions, and are then discharged by the rinsing water through an inner tube of the outlet 10. Any larger-sized impurities retained by the coarse sieve 3 may be removed by a detachment of the coarse sieve from the container 1, while fresh water is supplied to the fine sieve 5 through a nozzle 11—which supply is preferably pre-programmed—but only when the outlet valve 10 is opened, so that impurities are removed through the inner tube associated with a fine sieve 5; any small-sized impurities clinging to fine sieve 5 are removed following cleansing of the food, by cleansing of the fine sieve 5. Any impurities remaining on either the coarse sieve 3, or the fine sieve 5, are passed to the outlet valve 10 via a vent 12.

Figure 3:
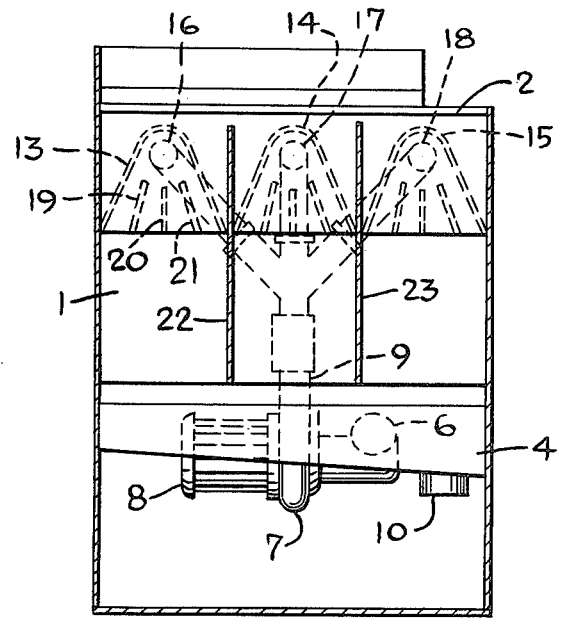
FIG. 3 is a section of the machine corresponding to that of FIG. 2, but additionally showing a plurality of nozzles adapted to expel a substantially flat jet stream.

The arrangement of flat nozzles shown in the upper portion of the container 1, according to FIG. 3, includes three nozzles 13, 14, and 15, each nozzle being operative for forming a flat jet, which nozzles are connected via tubes 16, 17, and 18, respectively, with the outlet tube 9 of the recirculating pump 8 (see also FIG. 1). The effect of the nozzles 13, 14, and 15, which produces a more uniform distribution of the recirculating fluid, can be improved even further by associating three guide walls 19, 20, and 21, with each of the nozzles, so that there are created, for example, a total of 12 outlet channels.

Finally, the container 1 can be sub-divided by a plurality of partitions 22 and 23, which completely fill its cross-section, into a plurality of individual container portions, which makes it possible to rinse several types of vegetables or salads simultaneously.

The programming sieve shown in FIG. 4, which is known per se, shows the dependence of time in seconds in the upper graph. In the second graph of the recirculating pump, both the timer and the recirculating pump are connected during the entire programming time. In the three lower graphs, there are shown operating times for the discharge of the rinsing water, for the replenishment of fresh water, and finally for the apportioning of, for example, inorganic minerals. The time up to 600 seconds applies to the so-called coarse program, and the remaining time of up to 900 seconds for the so-called fine program, which is provided for goods containing relatively few impurities, for example, fine salads grown in a greenhouse, or the like.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A food cleansing machine, comprising in combination:
    a drum-type container having a predetermined length and defining an entrance opening adapted to receive the food to be cleansed of impurities;
    a pump communicating interiorly with said container for injecting a rinsing fluid substantially tangentially into said container to circulate therein, for separating impurities from the food;
    nozzle means disposed near said entrance opening for forming the fluid received from the pump into an operative jet flow extending over substantially the entire length of said container and directed substantially towards the bottom of said container;
    coarse and fine sifting meshes disposed near the bottom of said container, said coarse sifting mesh being concave in shape substantially continuing the internal drum contour and disposed above and connected to said fine sifting mesh defining a collection space for collecting impurities therebetween, said coarse and fine sifting meshes having first and second predetermined mesh dimensions and operative surface areas, respectively, said first mesh dimensions of said coarse mesh substantially exceeding said second mesh dimensions of said fine mesh and said second operative surface area of said fine mesh exceeding said first operative surface area of said coarse mesh,
    a tube having open inlet and outlet ends, said open inlet and communicating with said collection space and said open outlet discharging to the exterior said impurities accumulated in said space; and
    collecting means conveying said rinsing fluid from the bottom of said container to said pump.

2. A food cleansing machine according to claim 1, wherein the first mesh dimensions are approximately 6 mm. in length and width, and said second mesh dimensions are approximately 0.4mm. in length and width.

3. A food cleansing machine according to claim 1, wherein said second operative surface area exceeds said first operative surface area by a factor of at least two.

4. A food cleansing machine according to claim 1, wherein said container has substantially the shape of a cylinder, having a longitudinal axis of predetermined length, and wherein said fine sifting mesh is disposed in a plane parallel to the longitudinal axis of said cylinder.

5. A food cleansing machine according to claim 1, wherein the rinsing fluid passes through the food cleansing machine in a predetermined direction, and wherein said fine sifting mesh is disposed at an angle with respect to said predetermined direction.

6. A food cleansing machine according to claim 1, wherein said fine sifting mesh has a cone-shaped profile.

7. A food cleansing machine according to claim 1, wherein said fine sifting mesh as a semi-circular shape.

8. A food cleansing machine according to claim 1, wherein said fine sifting mesh has detachably mounted on said container.

9. A food cleansing machine according to claim 1, wherein the container is a cylindrical container having a certain length, and has an entrance opening for the rinsing fluid to pass thereinto, and further comprising a nozzle disposed near said entrance opening for forming the fluid into an operative jet flow, said operative jet flow extending over substantially the entire length of said cylindrical container.

10. A food cleansing machine according to claim 9, wherein said nozzle means includes a plurality of nozzles, each of said nozzles being operative to expel a substantially flat jet stream, and further comprising a plurality of feed tubes connecting said pump to said nozzles, each nozzle communicating with a corresponding feed tube.

11. A food cleansing machine according to claim 10, wherein each nozzle comprises a plurality of partitions for splitting the substantially flat operative jet stream into a plurality of jet streamlets.

12. A food cleansing machine according to claim 1, wherein the rinsing fluid has a predetermined direction of flow, and said container is a substantially cylindrical container having a longitudinal axis, and further comprising a plurality of partition walls disposed substantially parallel to each other, and substantially at right angles to said axis.

13. A food cleansing machine according to claim 1, further comprising programming means for setting up, and controlling a discharge cycle for the rinsing fluid, a fluid-replenishing cycle, and an apportioning of additive means to the rinsing fluid.

14. A food cleansing machine according to claim 13, wherein said programming means is time-controllable to yield a coarse program of approximately 600 seconds duration, and a fine program of approximately 300 seconds duration.

15. The machine, as claimed in claim 1, further comprising flushing means for flushing impurities from said space towards said inlet end of said tube.

* * * * *